(12) United States Patent
Buter

(10) Patent No.: US 10,254,177 B2
(45) Date of Patent: Apr. 9, 2019

(54) TEMPERATURE-TO-DIGITAL CONVERTER

(71) Applicant: NXP B.V., Eindhoven (NL)

(72) Inventor: Berry Anthony Johannus Buter, Veldhoven (NL)

(73) Assignee: NXP B.V., Eindhoven (NL)

( * ) Notice: Subject to any disclaimer, the term of this patent is extended or adjusted under 35 U.S.C. 154(b) by 153 days.

(21) Appl. No.: 15/264,868

(22) Filed: Sep. 14, 2016

(65) Prior Publication Data

US 2018/0073938 A1 Mar. 15, 2018

(51) Int. Cl.
*G01K 7/21* (2006.01)
*G01K 7/34* (2006.01)

(52) U.S. Cl.
CPC ............ *G01K 7/34* (2013.01); *G01K 7/343* (2013.01)

(58) Field of Classification Search
CPC ............ G01K 7/30; G01K 7/21; G01K 3/005; G01K 7/00; G01K 7/34
USPC .................................. 37/184, 170, 178, 183
See application file for complete search history.

(56) References Cited

U.S. PATENT DOCUMENTS

| | | | | |
|---|---|---|---|---|
| 3,911,334 A * | 10/1975 | Brayshaw | ............... | H01G 2/14 361/274.1 |
| 4,158,805 A * | 6/1979 | Ballato | .................. | G01R 29/22 324/619 |
| 4,195,326 A * | 3/1980 | Ruegg | .................... | H01G 4/08 29/25.42 |
| 4,375,595 A * | 3/1983 | Ulmer | ..................... | G05F 3/30 323/314 |
| 4,907,449 A * | 3/1990 | Call | ...................... | G01L 9/0072 374/170 |
| 5,419,637 A * | 5/1995 | Frye | ........................ | G01K 7/01 374/141 |
| 5,804,958 A * | 9/1998 | Tsui | ........................ | G05F 3/262 323/313 |
| 5,982,221 A * | 11/1999 | Tuthill | .................... | G01K 7/01 257/E23.08 |
| 6,847,319 B1 * | 1/2005 | Stockstad | ............... | G01K 7/01 341/119 |
| 7,010,440 B1 * | 3/2006 | Lillis | ....................... | G01K 7/01 327/512 |
| 7,134,785 B2 | 11/2006 | Takashima et al. | | |
| 7,173,501 B1 * | 2/2007 | Varricchione | ........ | G01K 3/005 327/83 |
| 7,511,648 B2 * | 3/2009 | Trifonov | ............... | H03M 1/145 341/118 |
| 7,524,109 B2 * | 4/2009 | Gardner | ................. | G01K 7/01 374/178 |

(Continued)

OTHER PUBLICATIONS

Quan, Rui et al; "A 4600 μm2 1.5° C. (3o) 0.9kS/s Thermal-Diffusiveity Temperature Sensor with VCO-Based Readout"; IEEE ISSCC 2015/ Session 27/ Physical Sensors/ 27.8; 3 pages Feb. 25, 2015.

(Continued)

*Primary Examiner* — Gail Kaplan Verbitsky

(57) ABSTRACT

Disclosed is an integrated circuit temperature sensor including a first capacitor having a first capacitance relative to a temperature, a second capacitor a second capacitance relative to the temperature, and a controller configured to determine a ratio of the first capacitance to the second capacitance in order to determine a temperature of a region of the integrated circuit.

18 Claims, 3 Drawing Sheets

(56) References Cited

U.S. PATENT DOCUMENTS

| | | | | |
|---|---|---|---|---|
| 9,035,693 B2* | 5/2015 | Pan | ............................. | H03F 1/34 |
| | | | | 327/307 |
| 9,287,837 B2* | 3/2016 | Lau | ........................ | H03F 3/387 |
| 9,702,766 B2* | 7/2017 | Aliane | ..................... | G01K 7/34 |
| 9,835,575 B2* | 12/2017 | Cai | ......................... | G01N 25/18 |
| 9,857,814 B2* | 1/2018 | Cohen | ....................... | G05F 1/56 |
| 2005/0141151 A1* | 6/2005 | Azodi | .................... | H01G 4/385 |
| | | | | 361/15 |
| 2008/0258959 A1 | 10/2008 | Trifonov et al. | | |
| 2010/0111137 A1* | 5/2010 | Chen | ........................ | G01K 7/01 |
| | | | | 374/178 |
| 2014/0321507 A1 | 10/2014 | Aliane | | |
| 2016/0349783 A1* | 12/2016 | Kruiskamp | ............... | G05F 3/02 |
| 2017/0257113 A1* | 9/2017 | Singh | ........................ | G05F 3/245 |
| 2017/0288424 A1* | 10/2017 | Sawano | ................ | H02J 7/0019 |
| 2017/0322098 A1* | 11/2017 | Dawson | ................ | G01L 27/007 |

OTHER PUBLICATIONS

Souri, Kamran et al; "A CMOS Temperature Sensor With a Voltage-Colibrated Inaccuracy of ±0.15° (3o) From 55° C. to 125° C."; IEEE Journal of Solid-State circuits, vol. 48, No. 1; pp. 292-301 (Jan. 2013).

* cited by examiner

TEMPERATURE-TO-DIGITAL CONVERTER

TECHNICAL FIELD

Embodiments described herein include integrated circuit capacitor temperature sensors.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various exemplary embodiments are related to an integrated circuit temperature sensor including a first capacitor having a first capacitance relative to a temperature, a second capacitor having a second capacitance relative to the temperature and a controller configured to determine a ratio of the first capacitance to the second capacitance in order to determine a temperature of a region of the integrated circuit.

The first capacitor may be a fringe capacitor and the second capacitor may be a plate capacitor. The first capacitor may be a plate capacitor and the second capacitor may be a fringe capacitor.

The first capacitor and second capacitor may be of the same type and configured to have different temperature sensitivities.

The integrated circuit may include an integrator with capacitor configured to integrate charge from the first and second capacitors. A capacitor may be configured to provide negative feedback to an amplifier constituting an integrator. A comparator may be configured to produce a bit stream value per cycle based upon an output of the integrator.

The integrated circuit may include a first switch connected between a first voltage reference and a first terminal of the first capacitor, a second switch connected between the first terminal of the first capacitor and a ground, a third switch connected between a second terminal of the first capacitor and an input of the amplifier, and a fourth switch connected between the second terminal of the first capacitor and the ground, wherein the first and fourth switches are opened and closed at the same time according to a first control signal, wherein the second and third switches are opened and closed at the same time according to a second control signal, wherein the first and fourth switches are open when the second and third switches are closed, and wherein the first and fourth switches are closed when the second and third switches are open.

The integrated circuit of claim may include a comparator configured to produce a bit stream value per cycle based upon an output of the integrator, a fifth switch connected between a second voltage reference and a first terminal of the second capacitor, a sixth switch connected between the first terminal of the second capacitor and the ground, a seventh switch connected between a second terminal of the second capacitor and an input of the amplifier, and an eighth switch connected between the second terminal of the second capacitor and the ground, wherein the fifth and eighth switches are opened and closed according to the first control signal and the bit stream value per cycle, wherein the sixth and seventh switches are opened and closed according to a second control signal and the bit stream value per cycle, wherein the fifth switch is open when the seventh switch is closed.

The controller may be configured to count a number of 1 values in the bit stream over a number of cycles and configured to divide the number of 1 values by a number of cycles to determine the ratio.

The integrated circuit may include a negative branch including a negative voltage source and a positive branch including a positive voltage source. The negative branch may include a plurality of switches. The positive branch may include a plurality of switches.

Various exemplary embodiments are also related to a method of determining the temperature of an integrated circuit, including measuring a first capacitance of a first temperature sensitive capacitor, measuring a second capacitance of a second temperature sensitive capacitor, and determining a ratio of the first capacitance to the second capacitance in order to determine a temperature of the integrated circuit.

The method may include integrating charge from the first and second capacitances in an integrator capacitor over a predetermined time period.

The method may include comparing the voltage corresponding to integrated charge to a ground reference using a comparator to output a 1 bit when the voltage is positive. The method may also include comparing the voltage of the integrated charge to a ground reference using a comparator to output a 0 bit when the output of the voltage is not positive. The method may further include producing a bit stream value per cycle by a comparator based upon comparing the integrated charge to a ground reference.

The method may include counting a number of 1 values in the bit stream over a number of cycles and dividing the number of 1 values by a number of cycles to determine the ratio.

The first capacitor may be a fringe capacitor and the second capacitor may be a plate capacitor or the first capacitor may be a plate capacitor and the second capacitor may be a fringe capacitor.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Figure 1:
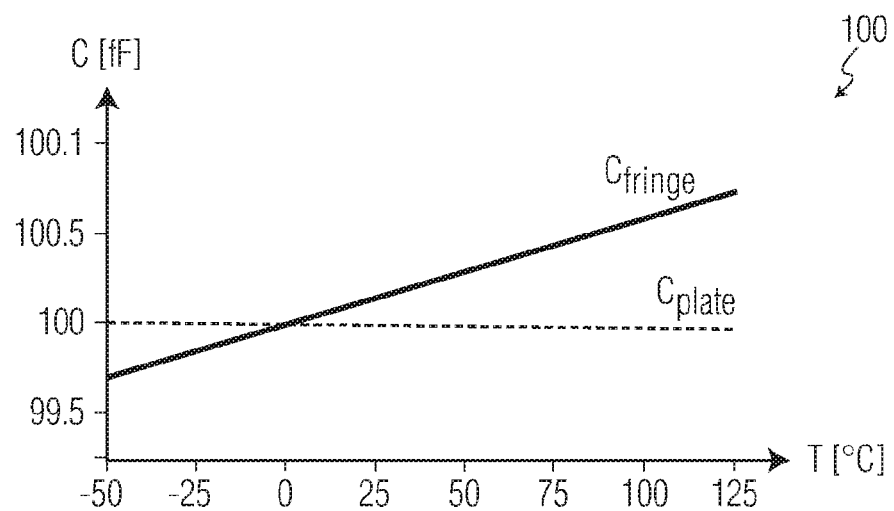
FIG. 1 illustrates the temperature dependence of a nominal fringe and plate capacitor in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated. Descriptors such as "first," "second," "third," etc., are not meant to limit the order of elements discussed, are used to distinguish one element from the next, and are generally interchangeable.

Most temperature sensors used in integrated circuits are bipolar-based. To read out from a bipolar device, a bias circuit is used to run continuous current there through, for proper setup and readout of the $V_{be}$ voltage, which is temperature dependent allows the temperature to be determined. For an accurate temperature read out, less dependent upon process spread, the $V_{be}$ voltage difference between two bipolar transistors with different bias currents can be measured. The current ratio between the two branches of bipolar transistors then only needs to be accurate. With increased technology scaling of the reduction of the size of circuit elements, the accuracy of bipolar transistor based temperature sensors decreases.

Using a capacitor as a temperature sensing element instead of a bipolar transistor eliminates the need for a continuous bias current and reduces the number of error sources. With increased technology scaling, the temperature sensitivity of a fringe capacitor increases. A fringe capacitor may have two sets of conductive fingers that connect together, interleaved on a same horizontal plane, and stacked one atop of another. When a semiconductor region is heated, the silicon or chip expands, and both the fringe capacitor conductive fingers height and spacing between them expand making the spacing between the fingers and the finger side area larger and the capacitance of the fringe region increases when the area increase dominates over the distance increase. For a plate capacitor the edge contribution, to the total capacitance, is significantly lower and therefore its capacitance will decrease as the silicon or chip expands.

A positive temperature coefficient for a material means that its capacitance increases with an increase in temperature. In CMOS technology a metal fringe capacitor has a positive temperature coefficient and a plate capacitor has a small negative temperature coefficient. These temperature coefficients can be adjusted by the construction and/or dimensioning of the capacitors, e.g. changing aspect ratio, finger spacing, and adding vias between stacked layers of fringe capacitor fingers. The sensitivity of these capacitors to temperature increases with increased technology scaling. The temperature of a given region may be measured by measuring the capacitance of that region.

A capacitance-to-digital converter (CDC), which is a form of analog-to-digital converter, may determine a ratio between the capacitance of a fringe capacitor and the capacitance of another capacitor, e.g. a plate capacitor having a different temperature sensitivity. A controller or other measurement device may be configured to obtain a read-out result based on the temperature dependent ratio of both capacitors and independent of other references such as voltage, current, or frequency. Using a CDC with nominal capacitance compensation may allow a small capacitance change to be measured as a function of temperature with high resolution without needing a large dynamic range.

FIG. 1 illustrates a temperature dependence graph 100 of a fringe capacitor and plate capacitor in accordance with embodiments described herein. A fringe capacitor $C_{fringe}$ has a positive temperature coefficient and a plate capacitor $C_{plate}$ has a small negative temperature coefficient. These coefficients are plotted as the lines in FIG. 1, having different slopes. For example, for a 100 fF nominal capacitance at 0° C. in a 0.14 μm process, the typical sensitivity of a fringe capacitor may be 6 aF/° C. and for a plate capacitor the sensitivity is −0.1 aF/° C. The sensitivity of the fringe capacitor may be increased by reducing finger spacing to an extent allowed by processing technology and adding vias between stacked layers of fringe capacitor fingers. Another option to increase the sensitivity is to place multiple unit capacitors in parallel.

Figure 2:
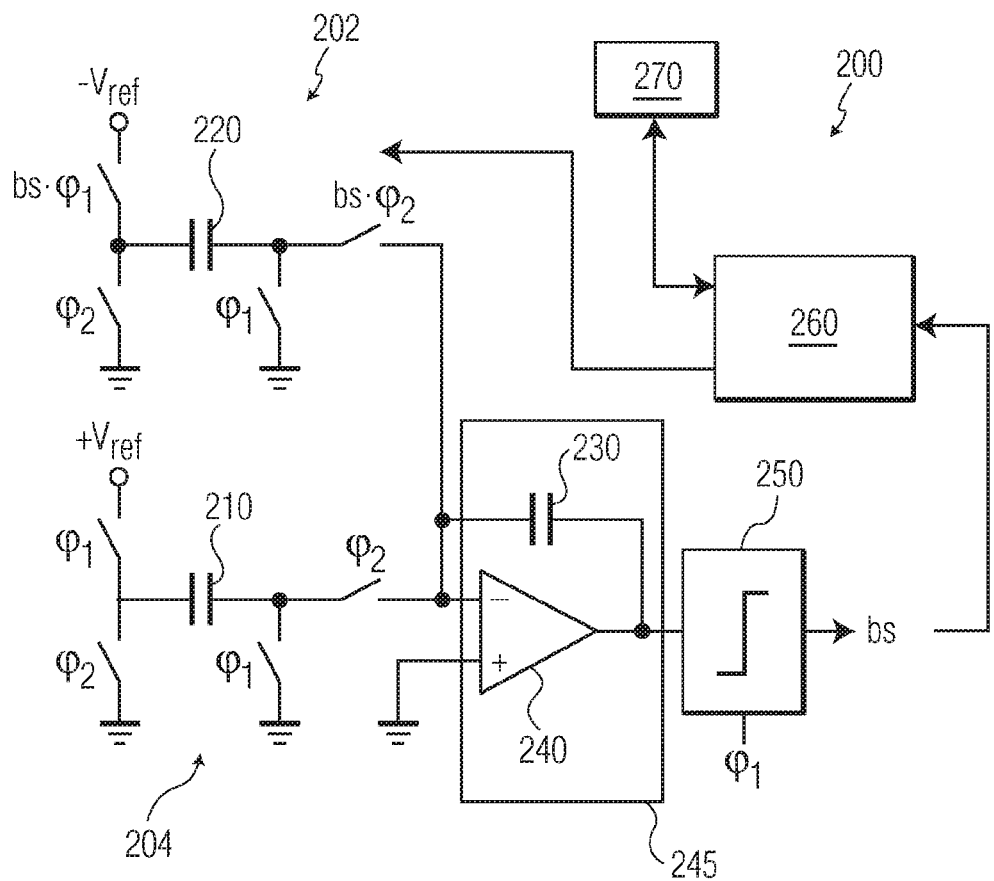
FIG. 2 illustrates a ratio metric ΣΔ based capacitance-to-digital converter in accordance with embodiments described herein.

FIG. 2 illustrates a ratio metric ΣΔ based capacitance-to-digital converter 200 in accordance with embodiments described herein. The CDC 200 is a form of an analog-to-digital converter. To measure the temperature of a given region includes a measurement of capacitance. For a fringe capacitor, higher temperatures yield a higher capacitance. At a given temperature, a fringe capacitor may store one amount of charge and a plate capacitor may store another amount of charge. A charge ratio between the amount of charge stored by the fringe capacitor and reference capacitor may be determined at different temperatures. Based on the charge ratio, the system may determine a temperature for a given region of an integrated circuit.

The ΣΔ based CDC 200, as illustrated in FIG. 2, may translate a capacitance read-out directly into a digital value indicating a capacitance ratio between a fringe capacitor 210 and a plate capacitor 220. The CDC 200 includes a negative branch 202 and a positive branch 204. Outputs from the negative branch 202 and positive branch 204 are fed into a negative terminal of an amplifier 240 and a capacitor 230 that is connected between the negative terminal and the output of the amplifier 240. The amplifier 240 and capacitor 230 constitute an integrator 245. Over a number of cycles, the capacitor 230 will receive inputs from the negative branch 202 and positive branch 204 and store a positive, negative or zero charge. The output from the integrator 245 is fed into a comparator 250 to determine a current state of a bitstream bs, as either a one or a zero. The CDC 200 may include a controller 260 to receive values of the bitstream bs from the comparator 250 and determine the current state of bs. The controller 260 may include a processor, memory, programmable input/output peripherals, and clock circuitry. The controller 260 may be used to set the speed and timing of the switches, and determine a number of samples to produce a bit ratio. The CDC 200 may include a decimation filter 270 to receive the bitstream bs from the controller 260, to determine the bit ratio of the bitstream bs over a number of cycles, and output a ratio to the controller 260. The controller 260 may control the various aspects of the CDC 200 including the integrator 245, comparator 250, and decimation filter 270. The bit ratio will provide a measure of the capacitance ratio between the fringe capacitor 210 and the plate capacitor 220 that can be used to determine a temperature value of a given region. The controller 260 may feed a value of bs received from the comparator 250 back into the CDC 200 to become a multiplier (logical AND) of $\varphi_1$ and $\varphi_2$ and the controller 260 is configured to continue the capacitance measurements of the CDC 200 as described herein.

In operation, during a first clock cycle $\varphi_1$, a fringe capacitor 210 is charged to $+V_{REF}$ and during a second clock cycle $\varphi_2$, the fringe capacitor 210 is discharged onto the integration capacitor 230. A boundary condition is that the value of the fringe capacitor 210 is less than that of a plate capacitor 220. During each clock period a charge packet accumulates on integrator capacitor 230. When the output of the amplifier 240 is positive the comparator 250 will generate an output bs=1 and when the output of the amplifier 240 is negative an output of bs=0. When the comparator 250 output bs=1, the reference capacitor 220 gets charged to $-V_{REF}$ during $\varphi_1$ and during $\varphi_2$ it is discharged. During $\varphi_2$ the charge added to the integrator capacitor 230 is $V_{ref}C_{210}-V_{ref}C_{220}$. Because $C_{220}$ is larger than $C_{210}$ this charge added during $\varphi_1$ is negative. This will cause the integrator 245 to continue to output 1s until enough negative charge has been integrated on the integration capacitor 230 so that the voltage is negative at which time the comparator will then output a 0. Then when bs=0, just the charge from $C_{210}$ will be integrated on the integration capacitor 230. Feedback ensures that the charge from fringe capacitor 210 and plate capacitor 220 are balanced over N clock periods and on average no charge is accumulated on integrator capacitor 230. This can be expressed as follows:

$$NV_{ref}C_{210} - N_{bs=1}V_{ref}C_{220} = 0$$

This can be rewritten as follows:

$$R = \frac{N_{bs=1}}{N} = \frac{C_{210}}{C_{220}}$$

$C_{210}$ represents the capacitance of a first capacitor such as a fringe capacitor, $C_{220}$ represents the capacitance of a second capacitor such as a plate capacitor, and the ratio R is the ratio of $C_{210}$ to $C_{220}$ which is also the average of the bit stream bs. The output R may depend on the temperature sensitivity ratio between the fringe capacitor 210 and plate capacitor 220. Using two capacitances with different temperature sensitivities may generate a temperature read-out independent of any reference voltage. To increase the temperature sensitivity of such a temperature-to-digital converter the difference between the temperature sensitivity of fringe capacitor 210 and plate capacitor 220 should be increased. Alternatively, capacitor 210 may represent a plate capacitor and capacitor 220 could be a fringe capacitor. Also, capacitors 210 and 220 could represent a same type of capacitor, given that their temperature sensitivities are different. Other circuits that measure the capacitance ratio may also be used to construct a temperature-to-digital converter by using two capacitors with different temperature sensitivities.

Figure 3:
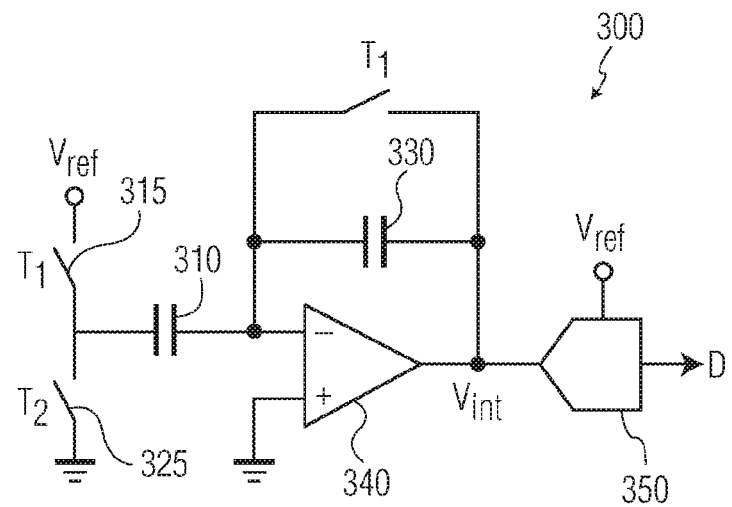
FIG. 3 illustrates a ratio metric charge amplifier based capacitance-to-digital converter in accordance with embodiments described herein.

FIG. 3 illustrates a ratio metric charge amplifier based capacitance-to-digital converter 300 in accordance with embodiments described herein. In a charge amplifier based CDC 300, as illustrated in FIG. 3, a voltage $V_{int}$ proportional to a ratio of fringe capacitor 310 and plate capacitor 320 may be generated which can then be converted to a digital output D with an ADC 350.

In operation, during a time period $T_1$ a switch 315 is closed, plate capacitor 320 is discharged, and fringe capacitor 310 is pre-charged to $V_{ref}$. During time period $T_2$ switch 325 is closed and capacitor 310 is discharged. Because the discharge current flows through capacitor 330, a voltage is built up at the output of the amplifier 340. Once the integrator voltage $V_{int}$ has settled the ADC 350 can convert the voltage to a digital value. The digital output D from the ADC 350 can be described as follows:

$$D = \frac{C_{310}}{C_{320}}$$

Figure 4:
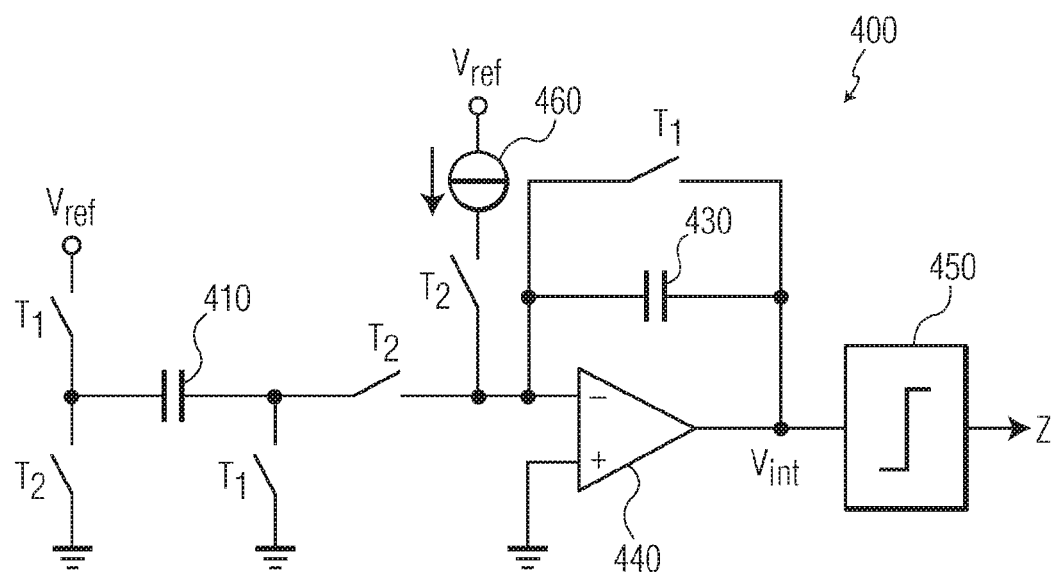
FIG. 4 illustrates a period modulation based capacitance-to-time converter in accordance with embodiments described herein.

FIG. 4 illustrates a period modulation based capacitance-to-time converter 400 in accordance with embodiments described herein. With a period modulator based capacitance-to-time converter 400, a capacitance value may be translated into a pulse time. Using a high frequency counter this pulse time, when output 475 is high, can be converted into a digital output. Performing two conversions, one where capacitor 410 may be a fringe capacitor, and another where capacitor 410 may be a plate capacitor and dividing the digital outputs, a ratiometric capacitance-to-digital conversion may be obtained.

During time period $T_1$ capacitor $C_{int}$ 430 is discharged and capacitor $C_x$ 410 is pre charged to $V_{ref}$. At the start of time period $T_2$ capacitor 410 is discharged. The discharge current flows through capacitor 430, and a voltage is built up at the output of the amplifier 440 leading to a step in the output voltage $V_{int}$ and the comparator 450 is triggered and generates a positive output. The integrator capacitance 430 is then discharged by the current source 460 and the integrator output voltage $V_{int}$ linearly ramps down and when it crosses the ground reference the comparator 450 is triggered again. The time period of the comparator pulse can be described as follows.

$$T_x = \frac{V_{ref}}{I_{int}} C_{410}$$

Doing another capacitance-to-time conversion with a reference capacitor $C_r$, counting the number pulses of a high frequency clock for the duration of both clock times, and dividing the digital results may allow the desired ratio T between $C_x$ and $C_r$ independent of $V_{ref}$ and $I_{int}$ to be calculated as follows.

$$T = \frac{T_x}{T_r} = \frac{D_x}{D_r} = \frac{C_{410}}{C_{430}}$$

The deviation from a nominal capacitance as a function of temperature is small for both fringe and plate capacitors. To measure a small variation as function of temperature may require both a large dynamic range and high resolution. The dynamic range may be reduced by only processing the variation. This can be achieved in the charge domain by subtracting a charge equal to the charge of the nominal capacitance. In a differential circuit realization the negative charge is readily available.

Figure 5:
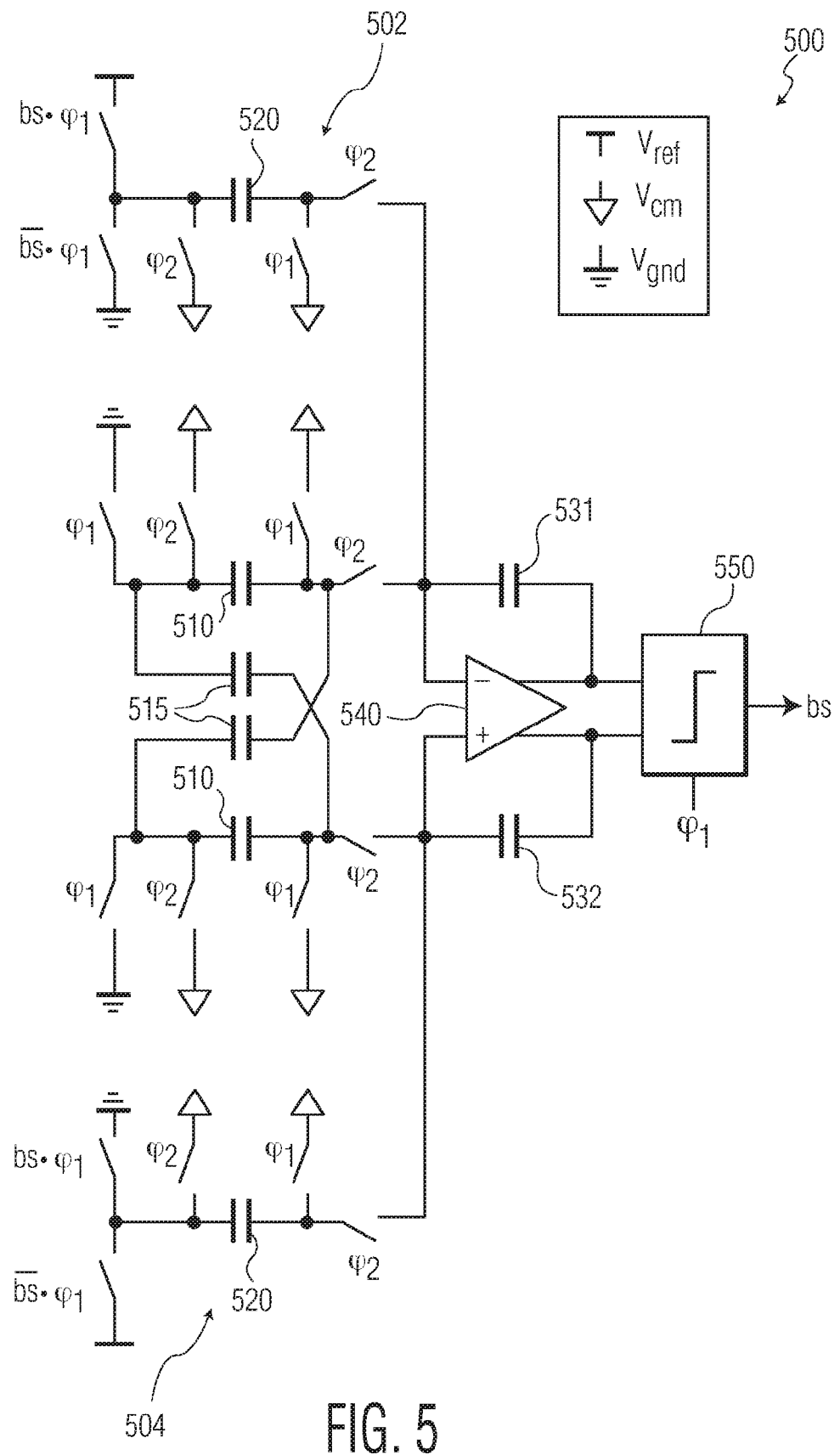
FIG. 5 illustrates a nominal capacitance compensating ratio metric ΣΔ converter based capacitance-to-digital converter in accordance with embodiments described herein.

FIG. 5 illustrates a nominal capacitance compensating ratio metric ΣΔ converter based capacitance-to-digital converter 500 in accordance with embodiments described herein. In FIG. 5, a first branch 502 having capacitances $C_{510}$ and $C_{520}$ with different temperature sensitivities, and a second branch 504 also having capacitances $C_{510}$ and $C_{520}$ with different temperature sensitivities may have a high nominal value with only a small temperature dependent variation. The branches 502 and 504 may include three reference voltages a reference voltage $V_{REF}$, a common mode voltage $V_{CM}$, and a ground voltage. A common mode voltage $V_{CM}$ is set to half a reference voltage $V_{REF}$. Capacitor $C_{515}$ is used to compensate for the nominal capacitance. The ratio R of this CDC 500 is:

$$R = \frac{N_{bs=1}}{N} = \frac{C_{510} - C_{515}}{2C_{520}} + \frac{1}{2}$$

Using capacitors with different temperature sensitivities may generate a temperature read-out independent of any reference voltage. To obtain the largest temperature sensitivity of such a temperature-to-digital converter the difference between the temperature sensitivity of $C_{510}$ and $C_{515}$ should be as large as possible and that of $C_{520}$ opposite to the slope of $C_{510}$-$C_{515}$. This can be obtained by choosing for $C_{510}$ a fringe capacitor and for $C_{515}$ a plate capacitor or vice versa and for $C_{520}$ a plate capacitor. To obtain a large variation in the ratio capacitor $C_{520}$ is typically small because it is scaled to half the variation of $C_{510}$-$C_{515}$ as function of temperature. Then also for $C_{520}$ a fringe capacitor can be chosen with minimal impact on the sensitivity. Depending on the choice of capacitor type the slope of the ratio versus temperature is either positive or negative. When the slope is negative a positive slope can be obtained by calculating the ratio R as the number of zeros in the bit stream divided by the total number of values N.

To achieve a desired resolution a high dynamic range to cover both the nominal capacitance and variation may be required that includes many conversion cycles and consuming significant power. To reduce the dynamic range, and minimize the number of conversion cycles and power, the offset capacitance 515 can be used to subtract a charge equal to the nominal capacitance charge from the capacitances respectively output from the first branch 502 and second branch 504. Thus the signal that is processed by the integrator may represent the temperature variation and less conversion cycles are used to obtain the desired resolution Although the various embodiments have been described in detail with particular reference to certain aspects thereof, it should be understood that the embodiments described herein are capable of other embodiments and its details are capable of modifications in various obvious respects. As is readily apparent to those skilled in the art, variations and modifications can be effected while remaining within the spirit and scope of the embodiments described herein. Accordingly, the foregoing disclosure, description, and figures are for illustrative purposes only and do not in any way limit the embodiments described herein, which is defined only by the claims.

The invention claimed is:

1. An integrated circuit temperature sensor, comprising:
    a first capacitor having a first temperature coefficient, reflecting capacitance variance with temperature, such that the first capacitor has a first capacitor capacitance at a temperature, and an output;
    a second capacitor having a second temperature coefficient, reflecting capacitance variance with temperature, wherein the second temperature coefficient differs from the first temperature coefficient, such that the second capacitor has a second capacitor capacitance at the temperature, and an output;
    an integrator having an amplifier with a negative terminal and a third capacitor which provides negative feedback to the amplifier, by selectively feeding the output of the first capacitor and the output of the second capacitor to the negative terminal and the third capacitor, the integrator being configured to integrate charge from the first capacitor and the second capacitor and having an output; and
    a controller configured to receive the output from the integrator to determine a ratio of the first capacitor capacitance to the second capacitor capacitance to determine a temperature of a region of the integrated circuit temperature sensor.

2. The integrated circuit temperature sensor of claim 1, wherein the first capacitor is a fringe capacitor and the second capacitor is a plate capacitor.

3. The integrated circuit temperature sensor of claim 1, wherein the first capacitor is a plate capacitor and the second capacitor is a fringe capacitor.

4. The integrated circuit temperature sensor of claim 1, wherein the first capacitor and the second capacitor have matching types and the first temperature coefficient differs from the second temperature coefficient.

5. The integrated circuit temperature sensor of claim 1, further comprising:
    a fourth capacitor configured to provide negative feedback to the amplifier in the integrator.

6. The integrated circuit temperature sensor of claim 5, further comprising:
    a comparator configured to produce a bit stream value per cycle based upon an output of the integrator.

7. The integrated circuit temperature sensor of claim 5, further comprising:
    a first switch connected between a first voltage reference and a first terminal of the first capacitor;
    a second switch connected between the first terminal of the first capacitor and a ground;
    a third switch connected between a second terminal of the first capacitor and the terminal of the amplifier; and
    a fourth switch connected between the second terminal of the first capacitor and the ground,
    wherein the first and fourth switches are opened and closed at the same time according to a first control signal from the controller, the second and third switches are opened and closed at the same time according to a second control signal from the controller, the first and fourth switches are open when the second and third switches are closed, and the first and fourth switches are closed when the second and third switches are open.

8. The integrated circuit temperature sensor of claim 7, further comprising:
    a comparator configured to produce a bit stream value per cycle based upon an output of the integrator;
    a fifth switch connected between a second voltage reference and a first terminal of the second capacitor;
    a sixth switch connected between the first terminal of the second capacitor and the ground;
    a seventh switch connected between a second terminal of the second capacitor and the terminal of the amplifier; and an eighth switch connected between the second terminal of the second capacitor and the ground, wherein the fifth and eighth switches are opened and closed according to the first control signal and the bit stream value per cycle, the sixth and seventh switches are opened and closed according to a second control signal and the bit stream value per cycle, and the fifth switch is open when the seventh switch is closed.

9. The integrated circuit temperature sensor of claim 1, wherein the controller is configured to count a number of 1 values in a bit stream over a number of cycles and configured to divide the counted number of 1 values by the number of cycles to determine the ratio.

10. The integrated circuit temperature sensor of claim 1, further comprising:
a negative branch including the first capacitor and a negative voltage source; and
a positive branch including the second capacitor and a positive voltage source.

11. The integrated circuit temperature sensor of claim 10, wherein the negative branch includes a plurality of switches.

12. The integrated circuit temperature sensor of claim 10, wherein the positive branch includes a plurality of switches.

13. A method of determining a temperature of an integrated circuit, comprising:
measuring a first capacitor capacitance of a temperature sensitive first capacitor having a first temperature coefficient reflecting capacitance variation with temperature and an output;
measuring a second capacitor capacitance of a temperature sensitive second capacitor having a second temperature coefficient reflecting capacitance variation with temperature and an output;
integrating charge from the first capacitor and the second capacitor in an integrator having an amplifier with a negative terminal and a third capacitor which provides negative feedback to the amplifier, by selectively feeding the output of the first capacitor and the output of the second capacitor to the negative terminal and the third capacitor, over a predetermined time period, to obtain an integrated charge value; and
determining a ratio of the first capacitor capacitance to the second capacitor capacitance using the integrated charge value to determine the temperature of the integrated circuit.

14. The method of claim 13, further comprising:
comparing a voltage corresponding to the integrated charge to a ground reference using a comparator configured to output a 1 bit when a result of the comparison is positive.

15. The method of claim 13, further comprising:
comparing a voltage corresponding to the integrated charge to a ground reference using a comparator configured to output a 0 bit when a result of the comparison is not positive.

16. The method of claim 13, further comprising:
producing a bit stream value per cycle by a comparator based upon comparing the integrated charge to a ground reference.

17. The method of claim 16, further comprising:
counting a number of 1 values in the bit stream over a number of cycles and dividing the counted number of 1 values by the number of cycles to determine the ratio.

18. The method of claim 13, wherein either the first capacitor is a fringe capacitor and the second capacitor is a plate capacitor or the first capacitor is a plate capacitor and the second capacitor is a fringe capacitor.

* * * * *